(12) United States Patent
Matsumoto et al.

(10) Patent No.: US 12,448,532 B2
(45) Date of Patent: Oct. 21, 2025

(54) INKJET INKS

(71) Applicant: Kao Corporation, Tokyo (JP)

(72) Inventors: Yuta Matsumoto, Cincinnati, OH (US); Todd Tritcak, Cincinnati, OH (US)

(73) Assignee: Kao Corporation, Tokyo (JP)

( * ) Notice: Subject to any disclaimer, the term of this patent is extended or adjusted under 35 U.S.C. 154(b) by 702 days.

(21) Appl. No.: 17/787,486

(22) PCT Filed: Dec. 20, 2019

(86) PCT No.: PCT/US2019/068041
§ 371 (c)(1),
(2) Date: Jun. 20, 2022

(87) PCT Pub. No.: WO2021/126267
PCT Pub. Date: Jun. 24, 2021

(65) Prior Publication Data
US 2023/0050122 A1 Feb. 16, 2023

(51) Int. Cl.
*C09D 11/108* (2014.01)

(52) U.S. Cl.
CPC .................. *C09D 11/108* (2013.01)

(58) Field of Classification Search
CPC ..... C09D 11/108; C09D 11/08; C09D 11/102; C09D 11/328; C09D 11/36
See application file for complete search history.

(56) References Cited

U.S. PATENT DOCUMENTS

| | | | |
|---|---|---|---|
| 4,011,385 A | 3/1977 | Wang et al. | |
| 5,302,631 A | 4/1994 | Yamada et al. | |
| 8,906,150 B2 | 12/2014 | Goredema et al. | |
| 2005/0257717 A1 | 11/2005 | Knott et al. | |
| 2007/0015863 A1* | 1/2007 | Matsunage | C09D 153/00 524/505 |
| 2011/0178214 A1* | 7/2011 | Tsukiana | C09D 11/322 524/378 |
| 2013/0035428 A1 | 2/2013 | Carlini et al. | |
| 2013/0131226 A1 | 5/2013 | Goredema et al. | |
| 2015/0291816 A1 | 10/2015 | Cross et al. | |
| 2016/0272827 A1 | 9/2016 | Goustiaux et al. | |
| 2018/0251650 A1* | 9/2018 | Xue | C09D 11/102 |

FOREIGN PATENT DOCUMENTS

| | | |
|---|---|---|
| CN | 103131259 A | 6/2013 |
| CN | 104583344 A | 4/2015 |
| CN | 104919014 A | 9/2015 |
| EP | 3 263 660 A1 | 1/2018 |
| JP | 2-276870 A | 11/1990 |
| JP | 2000-1642 A | 1/2000 |
| JP | 2004-277448 A | 10/2004 |
| JP | 2009-155572 A | 7/2009 |
| JP | 2014-214255 A | 11/2014 |
| JP | 2017-61637 A | 3/2017 |
| TW | 201323212 A1 | 6/2013 |
| WO | WO 2017/048499 A1 | 3/2017 |

OTHER PUBLICATIONS

International Search Report & Written opinion issued Mar. 18, 2020 in PCT/US2019/068041, filed on Dec. 20, 2019, 7 pages.
"Terpene Phenolic Resin", Yasuhara Chemical Co. Ltd., Aug. 12, 2019 (Aug. 12, 2019), [retrieved Feb. 25, 2020 (Feb. 25, 2020) via https://web.archive.org/web/20190812102941/https://www.yschem.co.jp/english/products/resin/terpene_phenol.html, 8 pages.
"Propylene glycol methyl ether", Wikipedia, Aug. 12, 2019 (Aug. 12, 2019) [retrieved: Feb. 2020 (Feb. 24, 2020), https://en.wikipedia.org/w/index.php?title=Propylene_glycol_methyl_ether&oldid=910481288, 2 pages.

* cited by examiner

*Primary Examiner* — Doris L Lee
(74) *Attorney, Agent, or Firm* — Oblon, McClelland, Maier &Neustadt, L.L.P.

(57) ABSTRACT

An inkjet ink that includes (A) a terpene resin made from α-pinene and (B) methyl ethyl ketone, which is characterized by extended decap times as well as quick drying properties when applied onto a substrate. A printed article including the inkjet ink in dried form, and a method of forming a printed image with a thermal inkjet printhead are also provided.

17 Claims, No Drawings

INKJET INKS

CROSS-REFERENCE TO RELATED APPLICATIONS

The present application is a 35 U.S.C. § 371 national stage application of International patent application PCT/US2019/068041, filed Dec. 20, 2019, incorporated herein by reference.

BACKGROUND OF THE INVENTION

Field of the Invention

The present invention relates to inkjet inks, specifically inkjet inks that include (A) a terpene resin made from α-pinene and (B) methyl ethyl ketone.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 pL or smaller in volume at frequencies of 36 kHz or greater.

However, thermal inkjet printing can be troubled by poor reliability over time. For example, some inkjet inks suffer from poor decap behavior (e.g., short decap times), in which solvent losses due to prolonged exposure to air within an uncapped printhead leads to clogging/plugging of printhead nozzles, and thus unreliable ink jetting and image quality erosion over time. On the other hand, the use of special solvent systems with high boiling components to prevent such premature solvent losses in an uncapped printhead setting require extended drying times once the inks are applied and thus inefficient overall printing processes. Therefore, it is often difficult to strike a balance between these competing issues of decap time (where the rate of solvent loss is too fast) and drying times (where the rate of solvent loss is too slow).

Several inkjet ink systems have been reported that utilize binder resins such as polyurethane resins, terpene resins, cellulose ester resins, sulfonamide-modified epoxy resins, rosin ester resins, terpene phenol resins, and acrylic resins for improved adhesion (WO2017/048499 and JP2000/001642, each incorporated herein by reference in its entirety). However, further improvements to decap time and drying time are still needed.

SUMMARY OF THE INVENTION

In view of the forgoing, there is a need for inkjet inks that have extended decap times, dry quickly once applied, and provide high gloss images.

Accordingly, it is one object of the present invention to provide novel inkjet inks that meet these criteria.

It is another object of the present disclosure to provide novel printed articles which contain a dried form of the inkjet inks.

It is another object of the present disclosure to provide novel methods of forming a printed image on a substrate by applying the inkjet inks onto the substrate and drying.

These and other objects, which will become apparent during the following detailed description, have been achieved by the inventors' discovery that the combination of a terpene resin formed from α-pinene and methyl ethyl ketone (MEK) unexpectedly provides inkjet inks characterized by extended decap times, and at the same time, quick drying properties once applied.

Thus, the present invention provides:

(1) An inkjet ink, comprising:
(A) a terpene resin made from α-pinene; and
(B) methyl ethyl ketone.
(2) The inkjet ink of (1), wherein the terpene resin (A) is a homopolymer made from α-pinene.
(3) The inkjet ink of (1) or (2), wherein the terpene resin (A) has a number average molecular weight of 500 to 1,500 g/mol.
(4) The inkjet ink of any one of (1) to (3), wherein the terpene resin (A) has a softening point of 60 to 160° C.
(5) The inkjet ink of any one of (1) to (4), wherein the terpene resin (A) is present in an amount of 0.1 to 10 wt. %, based on a total weight of the inkjet ink.
(6) The inkjet ink of any one of (1) to (5), wherein the methyl ethyl ketone (B) is present in an amount of 60 to 95 wt. %, based on a total weight of the inkjet ink.
(7) The inkjet ink of any one of (1) to (6), wherein a weight ratio of the methyl ethyl ketone (B) to the terpene resin (A) ((B):(A)) is 10:1 to 50:1.
(8) The inkjet ink of any one of (1) to (7), further comprising (C) a glycol ether.
(9) The inkjet ink of (8), wherein the glycol ether (C) has a boiling point of less than 200° C.
(10) The inkjet ink of (8) or (9), wherein the glycol ether (C) is present in an amount of up to 15 wt. %, based on a total weight of the inkjet ink.
(11) The inkjet ink of any one of (1) to (10), further comprising (D) a rosin resin.
(12) The inkjet ink of (11), wherein the rosin resin (D) is a hydrogenated acidic rosin.
(13) The inkjet ink of (11) or (12), wherein the rosin resin (D) is present in an amount of up to 10 wt. %, based on a total weight of the inkjet ink.
(14) The inkjet ink of any one of (1) to (13), further comprising (E) an arylalkyl-modified silicone resin.
(15) The inkjet ink of (14), wherein the arylalkyl-modified silicone resin (E) is present in an amount of up to 10 wt. %, based on a total weight of the inkjet ink.
(16) The inkjet ink of any one of (1) to (15), further comprising (F) a colorant.
(17) A printed article, comprising:
a substrate and a dried form of the inkjet ink of any one of (1) to (16) disposed on the substrate.
(18) A method of forming a printed image on a substrate, comprising:
applying the inkjet ink of any one of (1) to (16) onto the substrate with a thermal inkjet printhead; and drying the inkjet ink.
(19) The method of (18), wherein the inkjet ink is dried by leaving exposed to air for seconds or less.

(20) The method of (18) or (19), wherein a heater is not employed for drying the inkjet ink.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

The phrase "substantially free", unless otherwise specified, describes an amount of a particular component in the inkjet ink being less than 1 wt. %, preferably less than 0.5 wt. %, more preferably less than 0.1 wt. %, even more preferably less than 0.05 wt. %, yet even more preferably 0 wt. %/0, relative to a total weight of the inkjet ink.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having at least 1, preferably at least 2, preferably at least 3, preferably at least 4 carbon atoms and up to 22, preferably up to 20, preferably up to 18, preferably up to 12, preferably up to 8 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-propylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "aryl" refers to an aromatic group containing only carbon in the aromatic ring(s), such as phenyl, biphenyl, naphthyl, anthracenyl, and the like.

The term "arylalkyl", as used herein, refers to a straight, branched, or cyclic alkyl moiety (as defined above) that is substituted by an aryl group (as defined above) which may itself be optionally substituted by an alkyl group, examples of which include, but are not limited to, benzyl, phenethyl, 3-phenylpropyl, 2-phenylpropyl, 1-phenylpropyl, 4-phenylbutyl, 3-phenylbutyl, 2-phenylbutyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "(meth)acrylate" is used herein to refer to both acrylate and methacrylate groups. In other words, this term should be read as through "meth" is optional. Further, the terms "(meth)acrylate" or "(meth)acrylic" are used generally to refer to both acrylic acid-based compounds and acrylic ester-based compounds.

The term "decap behavior" herein, means the ability of the inkjet ink to readily eject from the printhead, upon prolonged exposure to air. The inkjet ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image. In its simplest form, one method for determining decap time involves printing a given test pattern with the printhead nozzles to verify their working condition. This is followed by exposing the nozzles to air for a fixed time without printing or spitting the nozzles. Then, all of the nozzles are printed again in the given test pattern for a second time. The test patterns are then compared to determine the number of weak or misdirected nozzles. In the worst case, such nozzle clogging or plugging results in a complete failure to fire by the nozzle.

Inkjet Inks

The present disclosure is directed to inkjet inks that possess suitable physical and chemical stability at both ambient temperatures and printhead operating temperatures, are jetted reliably, provide high optical density images, and have prolonged decap times while still drying quickly after being applied onto a substrate (e.g., dry times of 30 seconds or less). The combination of ingredients disclosed herein has been surprisingly found to strike a balance between fast dry times and extended decap time.

Inkjet inks of the present disclosure generally include the following components: (A) a terpene resin made from α-pinene and (B) methyl ethyl ketone, and optionally include one or more of (C) a glycol ether, (D) a rosin resin, (E) an arylalkyl-modified silicone resin, (F) a colorant, and (G) an additive.

(A) Terpene Resin Made from α-Pinene

The terpene resins (A) employed in the disclosed inkjet inks are those made from polymerization or oligomerization of α-pinene. As known by those of ordinary skill in the art, such terpene resins may be readily obtained for example through catalytic polymerization/oligomerization (in solution) of α-pinene monomers, which are in turn typically derived from fractional distillation of gum and sulfate turpentines obtained from pines such as *Pistacia terebinthus, Pinus pinaster, Pimis halepensis, Pinus massoniana, Pinus merkusih, Pinus palustris, Pinus taeda*, and *Pinus ponderosa*.

In preferred embodiments, the terpene resin (A) is a homopolymer made from α-pinene, with an α-pinene content (constitutional units derived from α-pinene) of at least 95 wt. %, preferably at least 96 wt. %, more preferably at least 97 wt. %, more preferably at least 98 wt. %, more preferably at least 99 wt. %, even more preferably at least 99.5 wt. %, yet even more preferably 100 wt. %, based on the total constitutional units (100 wt. %) of the terpene resin (A). While the terpene resins (A) of the present disclosure may include small amounts of other constitutional units other than constitutional units derived from α-terpene monomers, the amount of other (e.g. non-terpene based) constitutional units is preferably less than 5 wt. % c, more preferably less than 3 wt. %, more preferably less than 1 wt.

%, even more preferably less than 0.5 wt. %, yet even more preferably 0 wt. %, based on the total constitutional units (100 wt. %) of the terpene resins (A).

Both polymeric and oligomeric forms of the terpene resin (A) may be used herein, including combinations thereof. Typically, terpene resins (A) are used herein that have a number average molecular weight ($M_n$) of at least 330 g/mol, preferably at least 340 g/mol, preferably at least 400 g/mol, preferably at least 450 g/mol, preferably at least 500 g/mol, preferably at least 550 g/mol, more preferably at least 600 g/mol, more preferably at least 650 g/mol, even more preferably at least 700 g/mol, yet even more preferably at least 750 g/mol, and up to 1,500 g/mol, preferably up to 1,300 g/mol, more preferably up to 1,100 g/mol, more preferably up to 1,000 g/mol, more preferably up to 900 g/mol, even more preferably up to 800 g/mol, yet even more preferably up to 790 g/mol.

The terpene resins (A) may be in the form of a solid or a liquid at room temperature. When in the form of a solid, the terpene resin (A) utilized herein may be categorized based upon its softening point (SP), for example according to a ring-and-ball softening point method. The ring-and-ball softening point is defined as the temperature at which a disk of the sample held within a horizontal ring is forced downward a distance of 1 in. (25.4 mm) under the weight of a steel ball as the sample is heated at a prescribed rate in a glycerol bath (e.g., according to JIS B7410, which is incorporated herein by reference in its entirety). In some embodiments, the terpene resin (A) has a softening point of at least 60° C., preferably at least 80° C., more preferably at least 100° C., more preferably at least 110° C., more preferably at least 115° C., more preferably at least 120° C., even more preferably at least 125° C., yet even more preferably at least 130° C., and up to 160° C., preferably up to 155° C., preferably up to 150° C., preferably up to 145° C., preferably up to 140° C., preferably up to 138° C., preferably up to 135° C.

Bromine number is the amount of bromine ($Br_2$) in grams absorbed by 100 grams of a sample, and is an indicator of the degree of unsaturation of the sample. In some embodiments, the terpene resin (A) employed in the inkjet inks has a bromine number of at least 25, preferably at least 26, more preferably at least 27 and up to 35, preferably up to 34, more preferably up to 33, more preferably up to 32, even more preferably up to 31, yet even more preferably up to 30, although terpene resins (A) having a bromine number above or below (e.g., hydrogenated terpene resins (A)) these values may also find use in the disclosed inkjet inks.

The terpene resin (A) may be present in the inkjet inks in an amount of at least 0.1 wt. % preferably at least 0.5 wt. % c, more preferably at least 1 wt. %, more preferably at least 1.5 wt. %, more preferably at least 2 wt. %, even more preferably at least 2.5 wt. %, yet even more preferably at least 3 wt. %, and up to 10 wt. %, preferably up to 9 wt. %, more preferably up to 8 wt. %, more preferably up to 7 wt. %, more preferably up to 6 wt. %, even more preferably up to 5 wt. %, yet even more preferably up to 4 wt. %, based on a total weight of the inkjet ink.

The inkjet inks of the present disclosure may be formulated with a single type of terpene resin (A) made from α-pinene, or with a combination of two or more types of terpene resins (A) made from α-pinene. Examples of terpene resins (A) made from α-pinene that may be employed in the inkjet inks herein, either alone or in combination, include, but are not limited to, PICCOLYTE A115 (ring-and-ball SP=112-118° C., bromine number=31.5), PICCOLYTE A 125 (ring-and-ball SP=122-128° C., bromine number=31.5), PICCOLYTE A135 (ring-and-ball SP=132-138° C., bromine number=27), PICCOLYTE A135 PLUS (ring-and-ball SP=132-138° C.), PICCOLYTE AO PLUS (oligomer, liquid), and PINOVA RESIN 2495 (ring-and-ball SP=132-138° C., bromine number=27), each available from Pinova.

It has been unexpectedly discovered that the combination of a terpene resin (A) made from α-pinene and methyl ethyl ketone (B), as will be discussed below, furnishes inkjet inks with excellent dry times and at the same time excellent decap times (see e.g., Table 2, Examples 1, 5-10). On the other hand, it has been found that inkjet inks where the terpene resin (A) made from α-pinene is replaced by a terpene resin made from other terpene monomers (e.g., a terpene resin prepared from β-pinene, e.g., PICCOLYTE S135, ring-and-ball SP=130-136° C., bromine number=27, available from Pinova) or another resin/binder/tackifiers/ adhesive substance (e.g., a terpene phenol resin such as DERTOPHENE T160, a rosin resin such as FORAL AX, each available from Pinova, etc.), suffer from poor (i.e., short) decap times with nozzle misfirings occurring in 1 minute or less after decapping (see e.g., Table 2, Examples 2-4).

Solvent System

In many printing processes that utilize solvent-based inks, and particularly in thermal inkjet printing, the selection of an appropriate solvent system may impact the reliability of the printing process, the properties/appearance of the printed ink product, and the overall printing process efficiency. For example in thermal inkjet printing, the choice of solvent system may 1) aid bubble formation during the jetting process resulting in reliable ink jetting, 2) affect the stability/ volatility of the inkjet inks by changing the interaction dynamics between the solvent(s) and the various inkjet ink components and thus the decap behavior, kogation, and/or drop trajectory, 3) impact the adhesion, rub and scratch resistance, and optical density properties of the printed image through the interactive forces between the solvent system and the other inkjet ink components even though the solvent(s) may no longer be present, or may be present in lesser amounts, after drying, and/or 4) influence the drying time after application or the equipment needed to dry the applied ink.

In light of the above, particular preference is given to inkjet inks which further include (B) methyl ethyl ketone (MEK). The inclusion of methyl ethyl ketone (B) may aid solvation of the inkjet ink components and provide the inkjet inks with acceptable volatility for the purposes of dry times. It is preferred that methyl ethyl ketone (B) constitutes a majority of the solvent system used in the inkjet inks herein. In some embodiments, methyl ethyl ketone (B) is present in the inkjet inks in an amount of at least 60 wt. %, preferably at least 65 wt. %, more preferably at least 70 wt. %, more preferably at least 75 wt. %, even more preferably at least 80 wt. %, yet even more preferably at least 82 wt. %, and up to 95 wt. %, preferably up to 90 wt. %, more preferably up to 89 wt. %, more preferably up to 88 wt. %, even more preferably up to 86 wt. %, yet even more preferably up to 84 wt. %, based on a total weight of the inkjet inks.

In some embodiments, a weight ratio of the methyl ethyl ketone (B) to the terpene resin (A) ((B):(A)) is at least 10:1, preferably at least 15:1, more preferably at least 20:1, more preferably at least 25:1, even more preferably at least 28:1, yet even more preferably at least 30:1, and up to 50:1, preferably up to 45:1, more preferably up to 40:1, even more preferably up to 35:1, yet even more preferably up to 32:1.

In addition to methyl ethyl ketone (B), the inkjet inks may also optionally be formulated with a glycol ether (C) to further improve decap performance without adversely effecting ink dry times. The glycol ether (C) may be a monoalkyl ether, a dialkyl ether, a monoalkyl monoester ether, or a combination thereof. In preferred embodiments, the glycol ether (C) is a monoalkyl ether, i.e., contains one free hydroxyl group. When employed, the glycol ether (C) may be present in the inkjet inks in an amount of up to 15 wt. %, for example in an amount of at least 1 wt. %, preferably at least 2 wt. %, more preferably at least 3 wt. %, even more preferably at least 4 wt. %, and up to 15 wt. %, preferably up to 10 wt. %, more preferably up to 8 wt. %, even more preferably up to 6 wt. %, yet even more preferably up to 5 wt. %, based on a total weight of the inkjet inks.

Advantageous decap and dry time properties may be realized when glycol ethers (C) are employed which have a boiling point (at standard pressure) of less than 200° C., preferably less than 190° C., preferably less than 180° C., more preferably less than 170° C., more preferably less than 160° C., more preferably less than 150° C., more preferably less than 140° C., even more preferably less than 130° C., yet even more preferably less than 125° C.

The glycol ether (C) may contain preferably at least 3 carbon atoms, more preferably at least 4 carbon atoms, and preferably up to 12 carbon atoms, more preferably up to 10 carbon atoms, more preferably up to 8 carbon atoms. Acceptable examples of glycol ethers (C) that may be optionally included in the disclosed inkjet inks include, but are not limited to, ethylene glycol monomethyl ether, ethylene glycol monoethyl ether, ethylene glycol mono-isopropyl ether, ethylene glycol mono-n-propyl ether, ethylene glycol mono-t-butyl ether, ethylene glycol monobutyl ether, ethylene glycol mono-isobutyl ether, diethylene glycol monomethyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol monomethyl ether, propylene glycol methyl ether acetate, ethylene glycol dimethylether, diethylene glycol dimethylether, diethylene glycol methyl ethyl ether, diethylene glycol diethylether, dipropylene glycol dimethyl ether, as well as mixtures thereof. In preferred embodiments, the glycol ether (C) is at least one selected from the group consisting of ethylene glycol monomethyl ether, propylene glycol monomethyl ether, and propylene glycol mono-n-propyl ether, preferably propylene glycol monomethyl ether.

In addition to methyl ethyl ketone (B) and optionally the glycol ether (C), the inkjet inks may optionally contain one or more additional organic solvents. When present, the additional organic solvents may be included in amounts of up to 20 wt. %, preferably up to 15 wt. %, preferably up to 10 wt. %, preferably up to 5 wt. %, more preferably up to 4 wt. %, even more preferably up to 2 wt. %, yet even more preferably up to 1 wt. %. Exemplary additional organic solvents include, but are not limited to:

lower alcohols containing from 1 to 8 carbon atoms, such as methanol, ethanol, 1-propanol, 2-propanol, 1-butanol, 2-butanol;

ethers (non-glycol ethers), for example ethers containing 4 to 8 carbon atoms such as diethyl ether, dipropyl ether, methyl tert-butyl ether, dibutyl ether, dioxane, and tetrahydrofuran;

ketones (other than MEK), for example ketones containing 3 to 6 carbon atoms, including acetone, 3-pentanone, and cyclohexanone;

esters, including those having 3 to 8 carbon atoms, for example methyl acetate, ethyl acetate, n-butyl acetate, methyl lactate, ethyl lactate;

and the like, as well as mixtures of two or more thereof.

In some embodiments, the inkjet inks are substantially free of lower alcohol solvents (having 1 to 8 carbon atoms). In some embodiments, the inkjet inks are substantially free of ether solvents (other than glycol ethers (C)). In some embodiments, the inkjet inks are substantially free of ketone solvents (other than MEK), in particular, acetone. In some embodiments, the inkjet inks are substantially free of ester solvents. In some embodiments, the inkjet inks are substantially free of additional organic solvents, that is, organic solvents other than methyl ethyl ketone (B) and in some cases the glycol ether (C).

In preferred embodiments, the inkjet inks of the present disclosure are substantially non-aqueous, meaning that no water is added to the inkjet inks other than what may be incidental amounts of moisture derived from ambient conditions. In such cases, the inkjet inks may have less than 1 wt. %, preferably less than 0.5 wt. %, preferably less than 0.1 wt. % preferably less than 0.05 wt. %, preferably less than 0.01 wt. % of water, more preferably 0 wt. %, based on the total weight of inkjet inks.

Rosin Resin (D)

The inkjet inks may be optionally formulated with a rosin resin (D). Any rosin resin (D) that is compatible with the terpene resin (A) and methyl ethyl ketone (B) may be utilized herein, including rosin resins (D) derived from gum rosin, wood rosin, and tall oil rosin (the main components of which are resin acids such as abietic acid, palustric acid, neoabietic acid, pimaric acid, isopimaric acid and/or dehydroabietic acid), preferably rosin resins (D) derived from wood rosin. When employed, the rosin resin (D) may be used in an amount of up to 10 wt. %, for example at least 0.5 wt. %, preferably at least 1 wt. %, more preferably at least 1.5 wt. %, more preferably at least 2 wt. %, even more preferably at least 2.5 wt. %, yet even more preferably at least 3 wt. %, and up to 10 wt. %, preferably up to 8 wt. %, more preferably up to 6 wt. %, even more preferably up to 5 wt. %, yet even more preferably up to 4 wt. %, based on a total weight of the inkjet ink.

The rosin resin (D) may be formed by modifying the aforementioned rosins through esterification, hydrogenation (including partial hydrogenation), dimerization, and/or other modifications/functionalization for example through Diels-Alder reaction with an unsaturated di-acid (e.g., maleic or fumaric acid/anhydride), carboxylic acid reduction to the respective aldehydes/alcohols, double bond isomerization, dehydrogenation, oxidation, disproportionation, and the like. Exemplary rosin resins (D) include, but are not limited to:

a rosin ester resin, such as e.g., an ester of a rosin composed mainly of an abietic type or pimaric type resin acid that has been reacted with an alcohol(s) such as glycerin, pentaerythritol, ethylene glycol, diethylene glycol, triethylene glycol, methanol, etc., and optionally hydrogenated or partially hydrogenated, with specific mention being made to HARIESTER products available from Harima Chemicals, Inc., STAYBELITE ESTER 10-E and PERMALYN 6110, each available from Eastman, SUPER ESTER A-125, SUPER ESTER A-75, PENSEL D-125, PINECRYSTAL KE-359 available from Arakawa Chemical Industries, Ltd., and FORAL 85, FORAL 105, HERCOLYN products, PEXALYN products, and PENTALYN products available from Pinova;

a hydrogenated acidic rosin such as FORAL AX and FORAL DX, each available from Pinova a partially hydrogenated acidic rosin such as STAYBE-LITE RESIN-E, available from Eastman, and STAYBELITE and STAYBELITE A, each available from PINOVA;

a dimerized rosin such as POLY-PALE partially dimerized rosin available from Eastman; and a functionalized rosin resin, for example an ester (e.g., glycerol ester) of a rosin which has been modified with maleic anhydride or a rosin which has been subject to carboxylic acid reduction conditions, with specific mention being made to LEWISOL 28-M and Abitol-E hydroabietyl alcohol, each available from Eastman; and mixtures thereof.

In some embodiments, the rosin resin (D) has a softening point (ring-and-ball SP) of at least 50° C., preferably at least 55° C., more preferably at least 60° C., even more preferably at least 65° C., and up to 80° C., preferably up to 75° C., more preferably up to 70° C., even more preferably up to 68° C. In some embodiments, the rosin resin (D) is an acidic rosin (non-esterified) and has an acid number (in mg KOH/g) of at least 100, preferably at least 110, more preferably at least 120, more preferably at least 130, even more preferably at least 140, yet even more preferably at least 150, and up to 170, preferably up to 165, more preferably up to 160, even more preferably up to 158.

In preferred embodiments, the rosin resin (D) is a hydrogenated acidic rosin, preferably a hydrogenated acidic wood rosin, for example FORAL AX and FORAL DX, each available from Pinova. In some embodiments, the inkjet inks are substantially free of rosin ester resins, partially hydrogenated acidic rosins, dimerized rosins, and other functionalized/modified rosin resins. In some embodiments, a hydrogenated acidic rosin is the only rosin resin (D) present in the inkjet inks.

Arylalkyl-Modified Silicone Resin (E)

The inkjet inks may be optionally formulated with an arylalkyl-modified silicone resin (E). Generally, any silicone polymer or oligomer modified to contain at least one arylalkyl group can be used herein, including those based on a polydimethylsiloxane backbone, a poly(dimethylsiloxane-co-methylphenylsiloxane) backbone, a poly(dimethylsiloxane-co-diphenylsiloxane) backbone, or a poly(dimethylsiloxane-co-methylalkylsiloxane) backbone, where at least one methyl group, phenyl group, or alkyl group (other than methyl) which is bonded to a silicon atom is replaced with an arylalkyl group. KF-410, available from Shin-Etsu Chemical Co., is an example of an arylalkyl-modified polydimethylsiloxane, and BYK-322 and BYK-323, each available from BYK Additives & Instruments, are examples of an arylalkyl-modified poly(dimethylsiloxane-co-methylalkylsiloxane).

The arylalkyl modification may be a side-chain modification (where at least one methyl group, phenyl group, or alkyl group which is a side chain bonded to a silicon atom is replaced with an arylalkyl group), an end group modification (where at least one methyl group, phenyl group, or alkyl group bonded to a silicon atom at one or both ends of the polysiloxane is replaced with an arylalkyl group), or a combination thereof.

The arylalkyl group may have at least 7, preferably at least 8, more preferably at least 9 carbon atoms, and up to 32 carbon atoms, preferably up to 22 carbon atoms, more preferably up to 18 carbon atoms, even more preferably up to 12 carbon atoms, yet even more preferably an arylalkyl group having 9 carbon atoms. Exemplary arylalkyl groups include, but are not limited to, benzyl, phenethyl, 3-phenylpropyl, 2-phenylpropyl, 1-phenylpropyl, 4-phenylbutyl, 3-phenylbutyl, 2-phenylbutyl, 2-methylbenzyl, 3-methylbenzyl, 4-methylbenzyl, 2,4-dimethylbenzyl, and 2-(4-ethylphenyl)ethyl, 3-(3-propylphenyl)propyl, with particular preference given to 2-phenylpropyl (—CH$_2$—CH(C$_6$H$_5$)—CH$_3$).

In preferred embodiments, the arylalkyl-modified silicone resin (E) is an arylalkyl-modified polydimethylsiloxane, preferably a side-chain type arylalkyl-modified polydimethylsiloxane of formula (I)

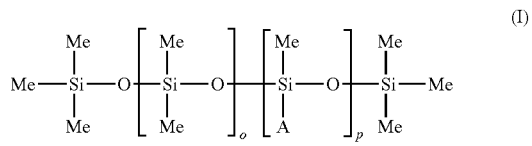

where A is an arylalkyl group as described above, o is 0 or a positive integer, and p is a positive integer. An example of this type of arylalkyl-modified silicone resin (E) is KF-410, available from Shin-Etsu Chemical Co.

In some embodiments, the arylalkyl-modified silicone resin (E) has a viscosity of at least 500 mm$^2$/s, preferably at least 600 mm$^2$/s, more preferably at least 700 mm$^2$/s, even more preferably at least 800 mm$^2$/s, yet even more preferably at least 900 mm$^2$/s, and up to 3,000 mm$^2$/s, preferably up to 2,500 mm$^2$/s, more preferably up to 2,000 mm$^2$/s, even more preferably up to 1,500 mm$^2$/s, yet even more preferably up to 1,000 mm$^2$/s.

The arylalkyl-modified silicone resin (E) may be employed in the inkjet inks in amounts of up to 10 wt. % c, based on a total weight of the inkjet ink, for example at least 0.1 wt. %, preferably at least 0.2 wt. %, more preferably at least 0.4 wt. %, more preferably at least 0.6 wt. %, even more preferably at least 0.8 wt. %, yet even more preferably at least 1 wt. %, and up to 10 wt. %, preferably up to 8 wt. %, more preferably up to 6 wt. %, more preferably up to 5 wt. %, more preferably up to 4 wt. %, more preferably up to 3 wt. %, even more preferably up to 2 wt. %, yet even more preferably up to 1.5 wt. %, based on a total weight of the inkjet ink.

Other Resins

In addition to the terpene resin (A), and any optional rosin resin (D) and/or arylalkyl-modified silicone resin (E) mentioned above, the inkjet inks may optionally contain other resins, binders, tackifiers, or adhesive substances in an amount of at least 0.1 wt. %, preferably at least 0.5 wt. %, preferably at least 1 wt. %, preferably at least 1.5 wt. %, preferably at least 2 wt. %, preferably at least 2.5 wt. %, and up to 10 wt. %, preferably up to 9 wt. %, preferably up to 8 wt. %, preferably up to 7 wt. %, preferably up to 6 wt. %, preferably up to 5 wt. %, preferably up to 4 wt. %, preferably up to 3 wt. %, based on a total weight of the inkjet ink. Such additional resins, binders, tackifiers, or adhesive substances may include, but are not limited to, terpene phenol resins (TPR), which are the copolymeric reaction products from alkylation of (i) one or more mono- or polyvalent phenolic compounds having at least two replaceable hydrogen atoms in ortho- and/or para-positions with respect to at least one hydroxyl group with (ii) one or more terpenes; such as those formed from copolymerization of (i) one or more phenolic compounds such as phenol, o-cresol, m-cresol, p-cresol, 2,5-xylenol, 2,3-xylenol, 3,4-xylenol, 3,5-xylenol, 2,3,5-trimethylphenol, isopropylphenol (e.g., 4-isopropylphenol), tert-butylphenol (e.g., 4-tert-butylphenol), amylphenol (e.g., 4-tert-amylphenol), heptylphenol (e.g., 4-heptylphenol), octylphenol (e.g., o-octylphenol, p-octylphenol, etc.), nonylphenol (e.g., 4-(2,4-dimethylheptan-3-yl)phenol), decylphenol, dodecylphenol, diphenylolpropane (bisphenol-A), phenylphenol (e.g., 3-phenylphenol), cumylphenol, mequinol, benzyloxyphenol, guaiacol, ethoxyphenol (e.g., 4-ethoxyphenol), resorcinol, pyrogallol, catechol, p-hydroquinone, 1-naphthol, and/or 2-naphthol, with (ii) one or more terpene monomers including linear monoterpenes (e.g., myrcene, ocimene, etc.), monocyclic monoterpenes (e.g., limonene, γ-terpinene, α-phellandrene, β-phellandrene, terpinolene, etc.), and/or bicyclic monoterpenes (e.g., 3-carene, α-pinene, β-pinene, α-fenchene, camphene, etc.); with specific mention being made to U130 POLYSTER (hydroxyl value (OHV)=25 mgKOH/g), U115 POLYSTER (OHV=30 mgKOH/g), T160 POLYSTER (OHV=60 mgKOH/g), T145 POLYSTER (OHV=65 mgKOH/g), available from Yasuhara Chemical Co. Ltd., and DERTOPHENE T (OHV=40 mgKOH/g), DERTOPHENE T160 (OHV=60 mgKOH/g), available from Pinova;

phenol resins (i.e. copolymers of phenolic compounds with formaldehyde), for example novolak resins such as PHENOLITE TD-2131 and PHENOLITE TD-2090 available from DIC Corp.;

polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;

epoxy resins including sulfonamide-modified epoxy resins for example AD-PRO MTS available from Rit-Chem;

(meth)acrylate and styrene/(meth)acrylate resins for example JONCRYL 63, JONCRYL 67, JONCRYL 586, JONCRYL 611, JONCRYL 682, JONCRYL 693, available from BASF, PARALOID DM-55 and PARALOID B-66, available from Palmer Holland, PARALOID B-72, available from Dow Chemical, USA, and ELVACITE 2013, available from Lucite Inc.;

polyurethane resins, such as those formed from reaction between (i) polyols including, but not limited to, ethylene glycol, propylene glycol, propanediol, butanediol, polyethylene glycol, polypropylene glycol, polytetrahydrofuran diol, 3-methyl-1,5-pentanediol, 1,9-nonanediol, polyester polyols such as polyethylene glycol adipate diol, polyethylene glycol succinate diol, poly(3-methyl-1,5-pentanediol adipate) glycol, poly(3-methyl-1,5-pentanediol terephthalate) glycol, carbonate polyols, and (ii) diisocyanates including, but not limited to, 2,4-toluene diisocyanate, 2,6-toluene diisocyanate, 4,4-diphenylmethane diisocyanate, hexamethylene diisocyanate, and isophorone diisocyanate; for example PERMAX 200, PERMAX 202, and SANCURE 20025F, available from Lubrizol;

polyvinyl butyral resins, for example PIOLOFORM BN 16 and MOWITAL B20H available from Kuraray America, Inc.;

polyhydroxystyrene resins such as poly(p-hydroxy styrene) from DuPont;

vinyl resins, for example UCAR VYHH, VMCH, VMCA, and VAGF, available from Dow Chemical Company, and VINNOL E15/45, H14/36, E15/45M, and E16/40A, available from Wacker Chemie AG, Germany;

sulfonamide modified formaldehyde resins such as p-toluene sulfonamide formaldehyde resin;

cellulose ester resins such as cellulose acetate butyrate (CAB-551-0.01) available from Eastman;

as well as polyesters, sulfonated polyesters, cellulose ethers, cellulose nitrate resins, polymaleic anhydrides, acetal polymers, styrene/butadiene copolymers, melamine formaldehyde resins, sulfonamide-modified melamine formaldehyde resins, ketone-aldehyde resins, and polyketone resins;

and the like, including mixtures thereof.

In some embodiments, the inkjet inks are substantially free of additional resins, binders, tackifiers, or adhesive substances, such as those mentioned above. In some embodiments, the inkjet inks are substantially free of polyurethane resins. In some embodiments, the terpene resin (A) is the only resin/binder/tackifiers/adhesive present in the inkjet inks. In some embodiments, the inkjet inks contain a combination of the terpene resin (A) and the rosin resin (D). In some embodiments, the inkjet inks contain a combination of the terpene resin (A) and the arylalkyl-modified silicone resin (E). In some embodiments, the inkjet inks contain a combination of the terpene resin (A), the rosin resin (D), and the arylalkyl-modified silicone resin (E), and are preferably substantially free of additional resins, binders, tackifiers, or adhesive substances.

(F) Colorant

It is to be readily appreciated by those of ordinary skill in the art that colorants may be optionally included in the inkjet inks to provide colored inks that may be used for a variety of printing purposes and the inkjet inks are not limited to any particular color. Any colorant can be employed in the inkjet inks to provide the desired color, including dyes, pigments, mixtures thereof, and the like, provided that the colorant can be dissolved or dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorants may be employed in amounts of at least 0.1 wt. %, preferably at least 0.5 wt. %, preferably at least 1 wt. %, preferably at least 2 wt. %, preferably at least 3 wt. %, and up to 20 wt. %, preferably up to 15 wt. %, preferably up to 10 wt. %, preferably up to 8 wt. %, preferably up to 7 wt. %, relative to the total weight of the inkjet inks.

The inkjet inks can be formulated with various dyes, with particular preference given to organic dyes such as OIL BLACK 860, available from Orient Chemical Industries, and metal complex dyes.

The inkjet inks can be formulated with various inorganic pigments and/or organic pigments. In addition to providing color to the inkjet inks, such pigments may be capable of improving the light resistance, the weather resistance, etc., of the printed images.

(G) Additive(s)

In addition to the components already mentioned, the inkjet inks may also optionally be formulated with various additives (G) to improve various ink characteristics and performance. For example, the inkjet inks may optionally contain one or more of an anti-kogation agent, a surfactant, a stabilizer, a humectant, and a security taggant.

Methods of Making

Embodiments of the inkjet inks described herein may be prepared by any suitable technique known to those of ordinary skill in the art, for example by combining components (A) a terpene resin and (B) methyl ethyl ketone with any optional organic solvents (e.g., (C) glycol ether) and any desired optional ingredients (e.g., (D) a rosin resin, (E) an arylalkyl-modified silicone resin, (F) a colorant, and/or an additive (G)), in any order and stirring, agitating, and/or homogenizing at a temperature between 20 and 100° C. for a suitable amount of time to form a homogeneous solution.

In one example, the inkjet ink may be made by first combining the terpene resin (A) with methyl ethyl ketone (B), and any optional resins (e.g., (D) a rosin resin, (E) an arylalkyl-modified silicone resin, and/or any additional resins, binders, tackifiers, or adhesive substances) or other optional additive(s) (G) in a vessel, followed by stirring for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. The glycol ether (C), when employed, may then be added to the resulting mixture, and subsequently stirred for at least 10 minutes, preferably at least 15 minutes, preferably at least 20 minutes, preferably at least 25 minutes. The colorant (F) may then be added as the final component with continued mixing, and the solution may then be mixed for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes to afford the inkjet ink. The resulting inkjet ink may then be placed into a printing cartridge, such as e.g., a FUNAI TIJ cartridge made by Funai Co., or other printhead suitable for MEK-based ink.

Properties

Among other advantages, the inkjet inks disclosed herein possess a superior combination of extended decap times and quick dry times after being applied. The inkjet inks disclosed herein also provide high optical density prints and can be tuned to provide desired gloss.

Dry times may be measured by applying the inkjet inks in the form of a solid block image (e.g., 1 cm*10 cm) onto a substrate, waiting for the inkjet inks to dry under ambient conditions (in air at room temperature, about 23° C., without applied heat), for a certain period of time, for example at 5, 10, 15, 20, 25, or 30 seconds, and then performing an abrasion test by finger to test if color transfers from the printed image to the finger at the tested time interval. If color transfer occurs, then the tested dry time is not satisfactory to achieve complete drying (rated "fail"). If no color transfer occurs, then the tested dry time is satisfactory to achieve complete drying (rated "pass"). Any inkjet inks requiring dry times of over 30 seconds to achieve a "pass" rating are considered unacceptable/slow drying ("Not Good"), while those which achieve a "pass" rating with dry times of 30 seconds or less are deemed acceptable/quick drying ("Good"). In preferred embodiments, the inkjet inks of the present disclosure have acceptable/quick dry times ("Good" rating), and dry within 30 seconds or less, preferably 25 seconds or less, more preferably 20 seconds or less, even more preferably 15 seconds or less after being applied.

The inkjet inks disclosed herein also possess extended decap times as measured by printing a narrow line picture (1 mm*1 cm, narrow lines, Monochrome bitmap), exposing the inkjet ink to air (decapping the ink cartridge) for a particular time (1 minute, 10 minutes, 60 minutes, etc.), reprinting the same narrow line picture, and comparing the reprinted image after decapping to the original image to determine if loss of nozzles occurred. If there are no missing nozzles at the tested time interval, then the inkjet inks are given a "Good" decap rating. If there are a few missing nozzles at the tested time interval, but not enough to significantly affect the clarity or readability of the narrow line picture, then the inkjet inks are given an "OK" decap rating indicating that the inkjet inks are acceptable. If there are a substantial number of missing nozzles at the tested time interval, to a degree in which the clarity or readability of the narrow line picture is significantly affected, then the inkjet ink is classified as Not Good ("NG") at that time interval. Preferred inkjet inks are those which maintain a "Good" or "OK" decap rating when decapped for 1 minute or longer, preferably 10 minutes or longer, more preferably 60 minutes or longer.

Optical density may be measured by printing a solid block image (e.g., 1 cm*10 cm) and taking optical density readings with a spectrophotometer (e.g., X-rite eXact, Density/TVI mode, sold by X-rite). As optical density is the measure of reflected or absorbed light being pulled into the printed surface, optical density values are dimensionless. Inkjet inks that produce images with optical density readouts of under 1.90 are considered to provide low optical density images, whereas those inkjet inks that provide optical density readouts of 1.90 or higher are deemed to provide high optical density images. In preferred embodiments, the inkjet inks of the present disclosure provide printed images having high optical densities of at least 1.90, preferably at least 1.91, preferably at least 1.92, preferably at least 1.94, preferably at least 1.96, preferably at least 1.98, preferably at least 2.00, preferably at least 2.05, preferably at least 2.10, preferably at least 2.15, preferably at least 2.17, and preferably up to 2.30, or preferably up to 2.20.

Another advantage of the disclosed inkjet inks is that they can be readily tuned in terms of gloss to provide printed images which have high, medium, or low gloss, as desired for a particular application. The gloss may be evaluated by simple visual inspection methods and categorized as "High" gloss, "Medium" gloss, or "Low" gloss. Alternatively, a glossmeter (e.g., BYK-Gardner haze-gloss reflectometer, from BYK-Gardner Geretsiried, Germany) may be used to measure the gloss intensity of a printed image at a 60° measurement angle (specular reflection) and the gloss may be recorded in terms of gloss units (GU), with "High" gloss being a 60° value of >70 GU, "Medium" gloss being a 600 value of to 70 GU, and "Low" gloss being a 60° value of <10 GU.

Printed Article

The inkjet inks can be printed on various substrates including three dimensional parts as well as flat sheets or webs that are supplied in roll form, for the manufacture of a wide variety of printed articles. Additionally, the substrates may possess various surface types, for example, a flat surface, a structured surface, such as grained surfaces, and a three-dimensional surface, such as curved and/or complex surfaces, which are notoriously difficult substrates owing to the long distance that the ink must travel to reach all parts of the curved and/or complex surface. Such printed articles may be suitable in the graphic arts, textiles, packaging (e.g., food packaging, pharmaceutical packaging, etc.), lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like.

The inkjet inks may be printed on porous or penetrable substrates, examples of which include, but are not limited to, non-coated paper, wood, membranes, and fabrics (including, for example, but not limited to, woven fabric, non-woven fabric, and foil-laminated fabric).

The inkjet inks may also be printed on non-porous or non-penetrable substrates, for example, various plastics, glass, metals (e.g., steel, aluminum, etc.), and/or non-penetration papers (e.g., coated papers). These may include, but are not limited to, molded plastic parts as well a flat sheets or rolls of plastic films. Examples include those containing polyesters such as polyethylene terephthalate (PET), biaxially oriented polystyrene (OPS), polyolefins such as polyethylene (PE), polypropylene (PP), and oriented polypropylene (OPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), and the like. In preferred embodiments, the substrate is a PET film, one example of which is U292W made by Teijin.

Method of Forming a Printed Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 µm×35 µm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 µm to 40 µm in diameter, inks that minimize clogging are desired. In particular, since thermal inkjet (TIJ) is an open atmosphere print head design (the nozzle orifices are open to atmosphere and there is no valve seal at the orifice to allow ink pressurization), TIJ printing has historically suffered from poor performance during intermittent printing, where decap time (print idle time) causes premature drying of ink in and around the nozzles.

The present disclosure provides a method of forming a printed image by applying the inkjet ink, in one or more of its embodiments, onto a surface of a substrate by a thermal inkjet printhead and allowing the inkjet ink to dry. Use of the inkjet inks described herein overcomes the competing problems of short decap time (rate of solvent loss is too fast) and slow drying times (rate of solvent loss is too slow) commonly associated with thermal inkjet processes, while still producing high quality prints.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have a droplet size in the range of 2 to 80 pL and a droplet frequency in the range of 10 to 100 kHz, and high quality prints may be obtained for example by setting the driving voltage to 8.0 to 9.5 Volts, the print speed up to 300 feet/minute, the pulse warming temperature to 25 to 45° C., and the pulse length to 0.7-2.5 microseconds, although values above or below these described may also be used and still obtain satisfactory prints. One non-limiting printhead example suitable for use in the disclosed methods is FUNAI TIJ cartridge made by Funai Co.

After application, the inkjet ink is dried. In preferred embodiments, drying is achieved by allowing the applied inkjet ink to dry under ambient conditions (in air, at about 23° C.) for seconds or less, preferably 25 seconds or less, more preferably 20 seconds or less, even more preferably 15 seconds or less.

While external heat may be applied to dry the applied inkjet inks, in preferred embodiments, external heat is not applied to facilitate drying or to increase drying speeds. For example, a heater is preferably not employed for drying the inkjet ink after application. Furthermore, the methods of the present disclosure do not require energy curing (e.g., UV or electron beam curing). Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

EXAMPLES

Inkjet Inks

Several example inkjet inks are given in Table 1 below. The amount of each component is expressed in terms of weight percentage relative to a total weight (100%) of the inkjet ink. Glycol Ether PM is propylene glycol monomethyl ether. PICCOLYTE A135, PICCOLYTE A115, PICCOLYTE A135 PLUS, and PICCOLYTE AO PLUS are terpene resins made from α-pinene, available from Pinova. PICCOLYTE S135 is a terpene resin made from β-pinene, available from Pinova. DERTOPHENE T160 is a terpene phenol resin available from Pinova. FORAL AX is a rosin resin (a hydrogenated acidic wood rosin) available from Pinova. KF-410 is an arylalkyl-modified silicone resin available from Shin-Etsu Chemical Co. OIL BLACK 860 is an organic dye available from Orient Chemical Industries. * denotes the example is a comparative example.

TABLE 1

Inkjet Ink Examples

| | Example 1 | Example 2* | Example 3* | Example 4* | Example 5 | Example 6 | Example 7 | Example 8 | Example 9 | Example 10 |
|---|---|---|---|---|---|---|---|---|---|---|
| MEK | 84.00 | 84.00 | 84.00 | 84.00 | 82.00 | 89.00 | 90.00 | 83.50 | 84.50 | 85.50 |
| Glycol Ether PM | 5.00 | 5.00 | 5.00 | 5.00 | 5.00 | — | — | 5.00 | 5.00 | 5.00 |
| PICCOLYTE A135 | 3.00 | — | — | — | 3.00 | 3.00 | 3.00 | — | — | 1.00 |
| PICCOLYTE A115 | — | — | — | — | — | — | — | 3.00 | — | — |
| PICCOLYTE A135 PLUS | — | — | — | — | — | — | — | — | 3.00 | — |
| PICCOLYTE AO PLUS | — | — | — | — | — | — | — | — | — | 1.00 |
| PICCOLYTE S135 | — | 3.00 | — | — | — | — | — | — | — | — |
| DERTOPHENE T160 | — | — | 3.00 | — | — | — | — | — | — | — |
| FORAL AX | — | — | — | 3.00 | 2.00 | — | — | — | — | — |
| KF-410 | 1.00 | 1.00 | 1.00 | 1.00 | 1.00 | 1.00 | — | 0.50 | 0.50 | 0.50 |
| OIL BLACK 860 | 7.00 | 7.00 | 7.00 | 7.00 | 7.00 | 7.00 | 7.00 | 8.00 | 7.00 | 7.00 |
| Total | 100.00 | 100.00 | 100.00 | 100.00 | 100.00 | 100.00 | 100.00 | 100.00 | 100.00 | 100.00 |

*denotes the example is a comparative example

Preparation Methods

To prepare the example inks, the resin(s) was first combined with methyl ethyl ketone (MEK), and mixed by mechanical stirrer for at least 30 minutes. Then glycol ether (if used) was added into the mixture and mixed for at least 15 minutes. The dye was then added into the mixture and mixed for at least 30 minutes to obtain the inkjet inks. The inkjet ink examples were then evaluated through a FUNAI TIJ cartridge made by Funai Co.

Softening Point (SP) Values of Resins

One example method for determining the softening point of resins is as follows: A 2.1 g sample in a molten state is injected into a given ring, and the sample is then cooled to room temperature, and thereafter the SP values are measured under the following conditions as prescribed in JIS B7410.

Measuring apparatus: Automatic Ring-and-Ball Softening Point;
Tester ASP-MGK2 (manufactured by MEITECH Company Ltd.);
Heating rate: 5° C./min;
Temperature at which heating is started: 40° C.;
Measurement solvent: glycerol.

Inkjet Ink Evaluation Methods

Printing Sample Preparation

Thermal printing technology related to FUNAI was used to evaluate the inks (Software and hardware made by XiJet, Transport table made by Kirk Rudy). A white PET film was used for the printing substrate (U292W made by TEJIN).

Dry Time Measurements

For evaluating dry times, the printing conditions utilized were as follows:
Printing resolution; 600 dpi*300 dpi (vertical*horizontal)
Printing speed; 100 feet/minute
Pre Fire 260 nsec
Dead Time 1200 nsec
Main Fire 500 nsec
Voltage 9.0 V
Temperature 30° C.
Printing image; 100% duty (1 cm*10 cm, Monochrome bitmap, solid block image)

The abrasion test was done by the finger after specific time passed (5, 10, 15, 20, 25, and 30 sec). A colored finger indicates not enough time has lapsed for complete drying ("fail"), and a non-colored finger indicates the time is adequate for complete drying ("pass"). Inkjet inks with a dry time of over 30 seconds to achieve a "pass" rating were deemed unacceptable/slow drying ("Not Good"), while those which achieve a "pass" rating with dry times of 30 seconds or less are deemed acceptable/quick drying ("Good").

Decap Time Measurements

For evaluating decap times, the printing conditions utilized were as follows:
Printing resolution; 300 dpi*300 dpi (vertical*horizontal)
Printing speed; 100 feet/minute
Pre Fire 260 nsec
Dead Time 1200 nsec
Main Fire 500 nsec
Voltage 9.0 V
Temperature 30° C.
Printing image; 100% duty (1 mm*1 cm, Monochrome bitmap, narrow line image)

The narrow line image was printed to confirm that there were no missing nozzles included in the printed image. After confirming, the printhead was left decapped for a specific time (1 min, 10 min, or 60 min), then reprinted using the same narrow line image. The reprinted image (after the specific time lapse) was checked for any missing nozzles. If there were no missing nozzles at the tested time interval, then the inkjet inks were given a "Good" decap rating. If there were a few missing nozzles at the tested time interval, but not enough to significantly affect the clarity or readability of the narrow line picture, then the inkjet inks were given an "OK" decap rating. If there were a substantial number of missing nozzles at the tested time interval, to a degree in which the clarity or readability of the narrow line picture is significantly/negatively affected, then the inkjet ink was classified as Not Good ("NG") at that time interval. Inkjet inks which maintain a "Good" or an "OK" decap classification when decapped (i.e., exposed to air) for each of the tested time intervals were considered to have advantageous/acceptable decap behavior (extended or prolonged decap times).

Gloss Evaluation

After complete drying, the printed image samples from the Dry time measurements were visually inspected for gloss and categorized as "High" gloss, "Medium" gloss, or "Low" gloss.

Inkjet Ink Performance

TABLE 2

Inkjet Ink Performance

|  | Example 1 | Example 2* | Example 3* | Example 4* | Example 5 | Example 6 | Example 7 | Example 8 | Example 9 | Example 10 |
|---|---|---|---|---|---|---|---|---|---|---|
| Dry time | Good | Good | Good | Good | Good | Good | Good | Good | Good | Good |
| Decap Time/ 1 min | Good | NG | NG | NG | Good | OK | OK | Good | Good | Good |
| Decap Time/ 10 min | Good | NG | NG | NG | Good | OK | OK | Good | Good | Good |
| Decap Time/ 60 min | Good | NG | NG | NG | Good | Good | Good | Good | Good | Good |
| Gloss | High | Low | High | High | High | High | Medium | Medium | Medium | Medium |

*denotes the example is a comparative example

As shown in Table 2, inkjet inks containing a terpene resin made from α-pinene in combination with methyl ethyl ketone (Examples 1, and 5-10) achieved remarkable effects in terms of both dry times (quick drying) and decap times (extended decap). On the other hand, inkjet inks in which the terpene resin made from α-pinene was replaced with a terpene resin made from β-pinene (Comparative Example 2) gave unacceptable decap times at all decap times tested, including short 1 minute decap times. Similarly, inkjet inks in which the terpene resin made from α-pinene was replaced with a terpene phenol resin (Comparative Example 3), or a rosin resin (Comparative Example 4) also gave unacceptable decap times at all decap times tested.

Where a numerical limit or range is stated herein, the endpoints are included. Also, all values and subranges within a numerical limit or range are specifically included as if explicitly written out.

As used herein the words "a" and "an" and the like carry the meaning of "one or more."

The present disclosure also contemplates other embodiments "comprising", "consisting of" and "consisting essentially of", the embodiments or elements presented herein, whether explicitly set forth or not.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:
   (A) a terpene resin made from a-pinene; and
   (B) methyl ethyl ketone,
   wherein the terpene resin (A) is a homopolymer made from a-pinene, and
   the terpene resin (A) has a number average molecular weight of 700 to 800 mol/g, a softening point of 140° C. or less, and a bromine number of 27 to 31,5.

2. The inkjet ink of claim 1, wherein the terpene resin (A) is present in an amount of 0.1 to 10 wt. %, based on a total weight of the inkjet ink.

3. The inkjet ink of claim 1, wherein the methyl ethyl ketone (B) is present in an amount of 60 to 95 wt. %, based on a total weight of the inkjet ink.

4. The inkjet ink of claim 1, wherein a weight ratio of the methyl ethyl ketone (B) to the terpene resin (A) ((B):(A)) is 10:1 to 50:1.

5. The inkjet ink of claim 1, further comprising (F) a colorant.

6. The inkjet ink of claim 1, further comprising (E) an arylalkyl-modified silicone resin.

7. The inkjet ink of claim 6, wherein the arylalkyl-modified silicone resin (E) is present in an amount of up to 10 wt. %, based on a total weight of the inkjet ink.

8. The inkjet ink of claim 1, further comprising (C) a glycol ether.

9. The inkjet ink of claim 8, wherein the glycol ether (C) has a boiling point of less than 200° C.

10. The inkjet ink of claim 8, wherein the glycol ether (C) is present in an amount of up to 15 wt. %, based on a total weight of the inkjet ink.

11. The inkjet ink of claim 1, further comprising (D) a rosin resin.

12. The inkjet ink of claim 11, wherein the rosin resin (D) is a hydrogenated acidic rosin.

13. The inkjet ink of claim 11, wherein the rosin resin (D) is present in an amount of up to 10 wt. %, based on a total weight of the inkjet ink.

14. A printed article, comprising:
   a substrate and a dried form of the inkjet ink of claim 1 disposed on the substrate.

15. A method of forming a printed image on a substrate, comprising:
   applying the inkjet ink of claim 1 onto the substrate with a thermal inkjet printhead; and
   drying the inkjet ink.

16. The method of claim 15, wherein the inkjet ink is dried by leaving exposed to air for 30 seconds or less.

17. The method of claim 15, wherein a heater is not employed for drying the inkjet ink.

* * * * *